United States Patent [19]

Epstein

[11] 4,024,447

[45] May 17, 1977

[54] STEPPING MOTOR DRIVING APPARATUS

[75] Inventor: Maurice J. Epstein, Ardsley, N.Y.

[73] Assignee: Computer Transceiver Systems, Inc., Paramus, N.J.

[22] Filed: June 25, 1975

[21] Appl. No.: 590,089

[52] U.S. Cl. .............................................. 318/696
[51] Int. Cl.² ...................................... H02K 37/00
[58] Field of Search ........................... 318/685, 696

[56] References Cited

UNITED STATES PATENTS

| 3,374,410 | 3/1968 | Cronquist et al. | 318/685 |
| 3,411,058 | 11/1968 | Madsen et al. | 318/696 |
| 3,445,741 | 5/1969 | Gerber | 318/696 |
| 3,746,959 | 7/1973 | Kobayashi et al. | 318/696 |
| 3,755,727 | 8/1973 | Schifalacqua | 318/696 |
| 3,942,619 | 3/1976 | Nordstrom et al. | 318/696 X |

Primary Examiner—Gene Z. Rubinson
Attorney, Agent, or Firm—Hane, Sullivan & Spiecens

[57] ABSTRACT

A source of electric current has a first terminal connected to one end of each of a plurality of phase windings of a stepping motor whose other ends are connected via controllably operable switches to a second terminal of the current source, the switches are energized in particular sequence and with controllably variable duty cycle signals wherein the duty cycle of the signals controls the power, speed and rotation of the motor.

14 Claims, 10 Drawing Figures

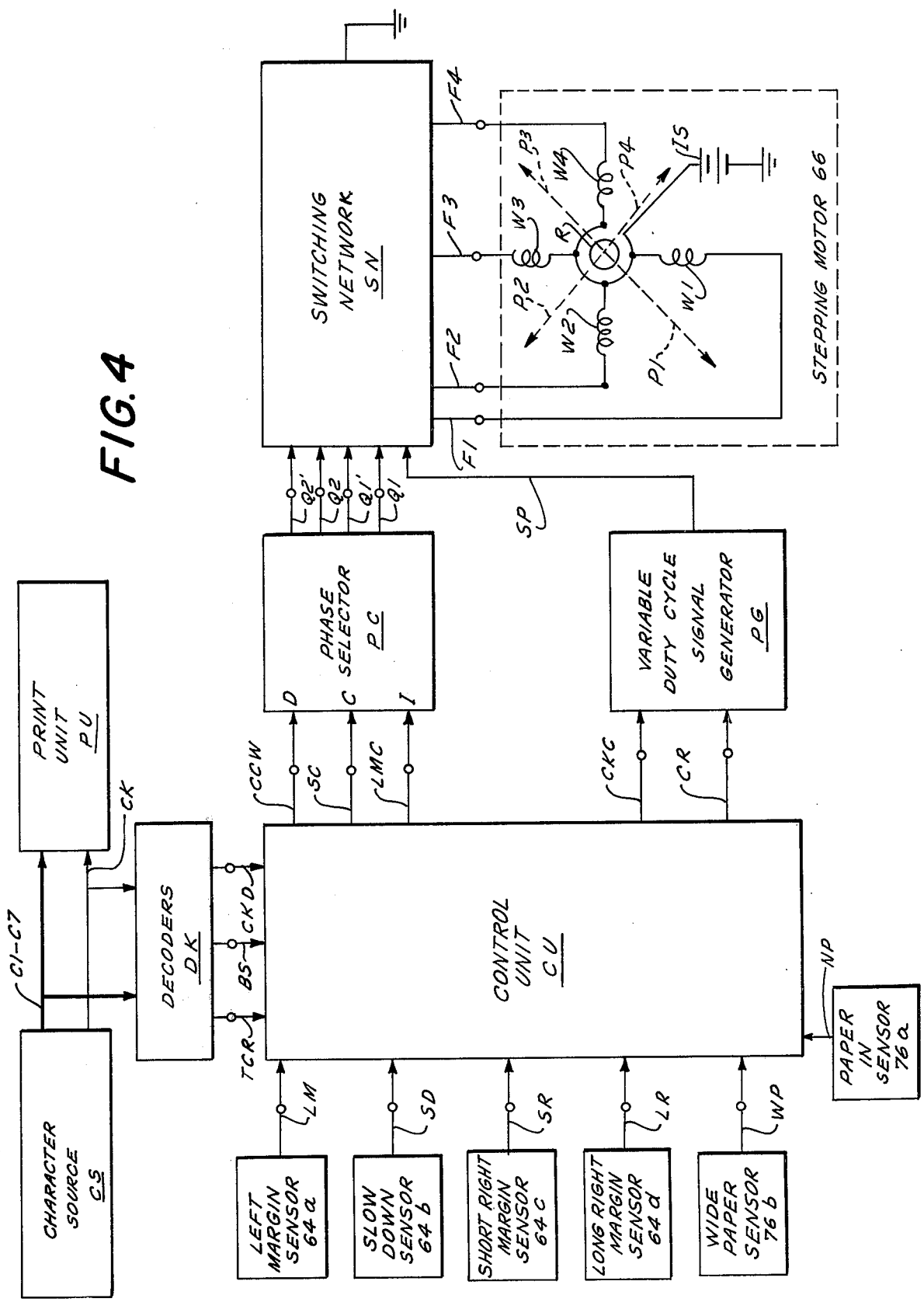

STEPPING MOTOR DRIVING APPARATUS

This invention pertains to the energization of stepping motors.

Stepping motors have many applications where controllable movements of elements are required. As an example, consider a printer wherein a stepping motor can be used to perform vertical indexing of the paper (line feed) and a stepping motor can be used for horizontal indexing of the print head. In this and other applications the amount of time that the stepping motor is moving is small compared to the amount of time which the stepping motor is holding its position.

In general, the amount of current required to step the motor is considerably more than the amount of current required to hold the motor at rest. Heretofore, the switching between high current and low current was accomplished by connecting the motor to a power supply via the parallel combination of a load resistor and a switch. When only holding current is required, i.e., when the motor is at standstill, the switch is opened. Therefore, most of the power is dissipated in the resistor and just sufficient holding power is received by the motor. When stepping is required the switch is closed and full power is applied to the motor.

It should be apparent that this presently used technique has two disadvantages. First, it wastes electric power in that during the major part of the printer operation the stepping motors are at a standstill and during this time the motors receive minimum power with the remainder of power being dissipated in load resistors. Second, the power is dissipated by the load resistors in the form of heat. Many devices and particularly printers are enclosed by confining housing. Therefore, there arises the need to remove such heat or the mechanisms will overheat.

It is accordingly an object of the invention to provide improved apparatus for driving a stepping motor.

It is another object of the invention to provide improved apparatus to drive a stepping motor which is not wasteful of power and does not produce excessive quantities of useless heat.

It is a further object of the invention to provide apparatus for driving a stepping motor which only draws needed power.

These and other objects, as well as the advantages and features of the invention will be apparent from the following detailed description when read with the accompanying drawing which shows by way of example and not limitation apparatus for realizing the invention. In the drawings:

FIG. 4 is a block diagram of the apparatus for controlling one of the stepping motors.

Figure 1:
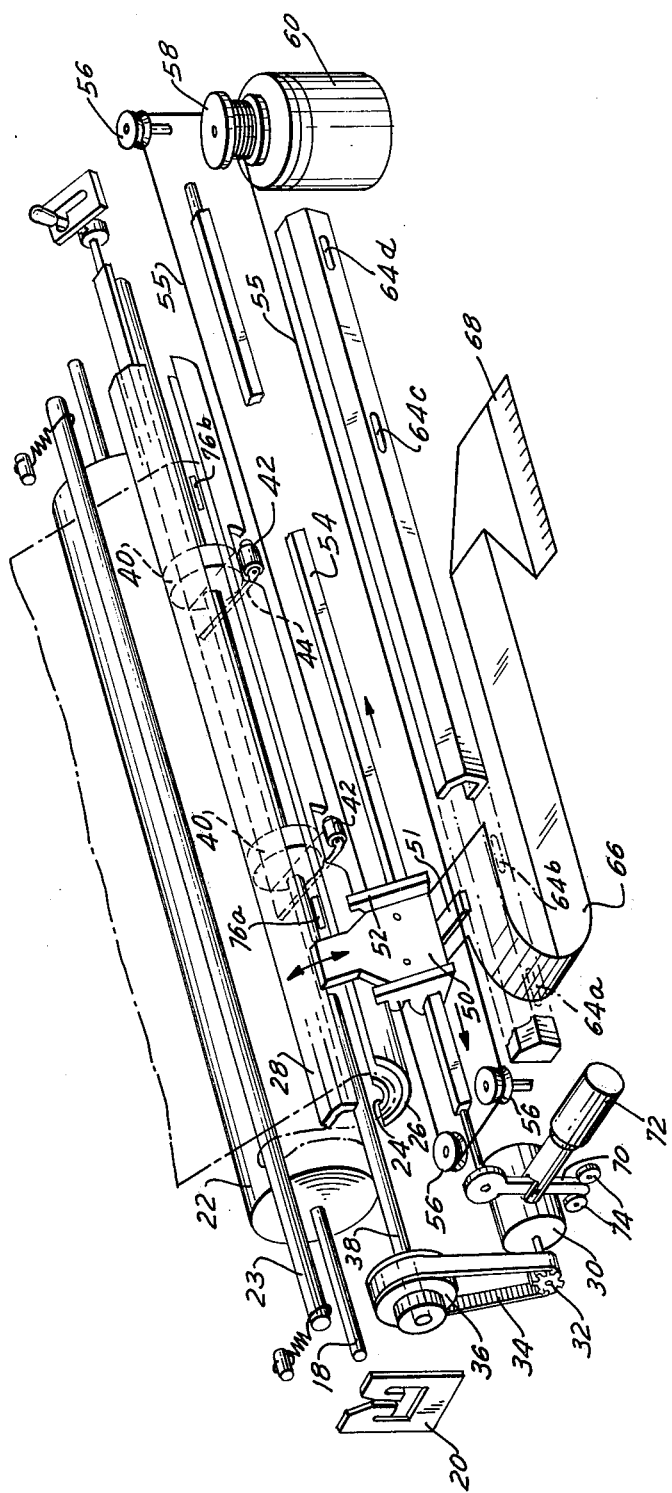
FIG. 1 is a schematic perspective of a printer with its main frame removed to show the stepping motors used therein.
Figure 2:
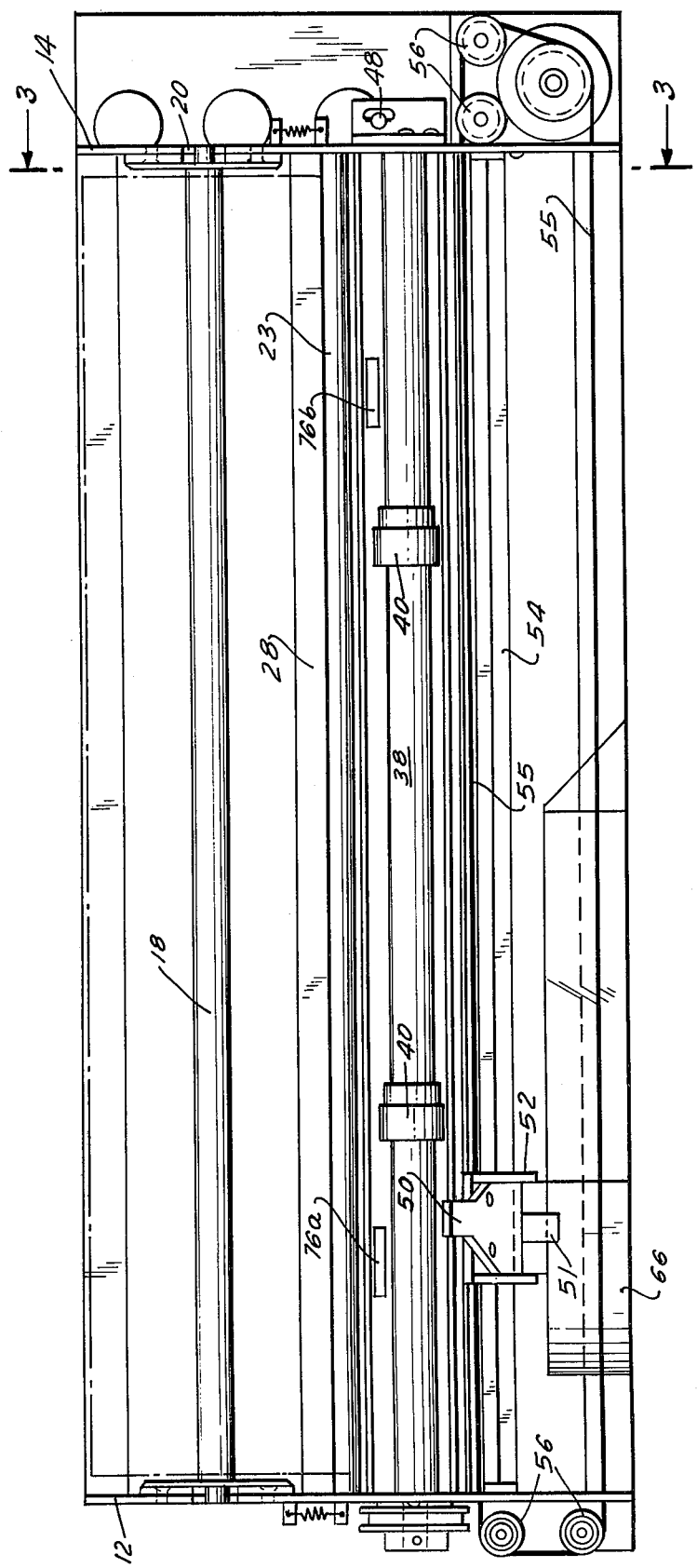
FIG. 2 is a top plan view of the printer with a sensor housing removed.
Figure 3:
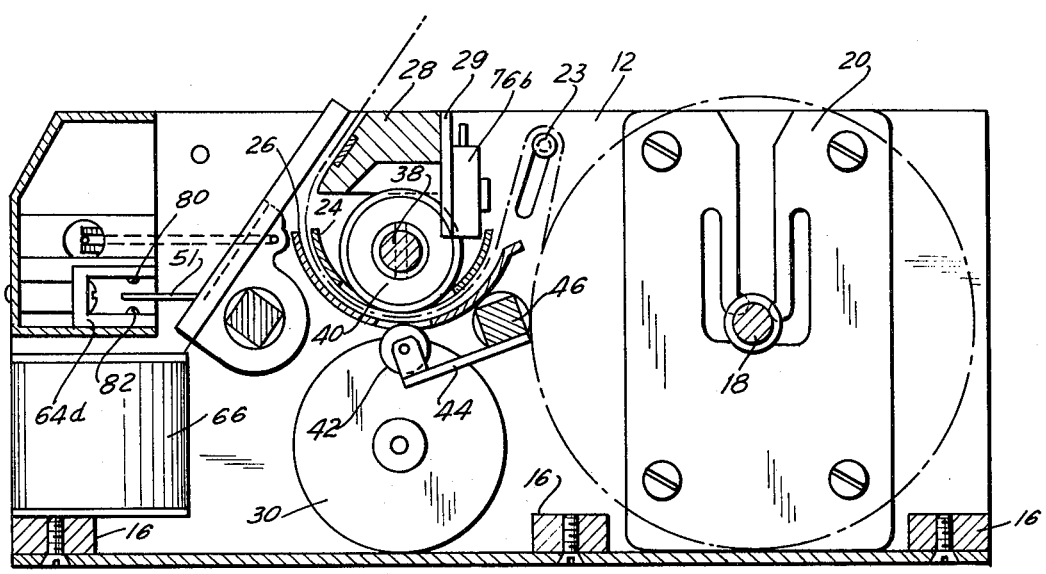
FIG. 3 is a transverse vertical section taken along line 3—3 of FIG. 2.

The printer shown schematically in FIG. 1 and in more detail in FIGS. 2 and 3 is supported by a frame comprising left end wall 12 and right end wall 14 fixed to horizontal base rods 16 (see FIG. 3). The printer includes a paper supply shaft 18 carried by slotted paper supply supports 20 fixed to the end walls 12 and 14 upon which is spindled a roll of paper 22. The paper passes over a spring loaded dancer roller 23 through a paper guide comprising a rear chute 24 and a front chut 26, and over plate 28.

Paper is fed by means of paper feed stepping motor 30 having a paper feed drive pulley 32 which drives driver pulley 36 via belt 34. Pulley 36 in turn rotates feed shaft 38 to which are connected paper feed rollers 40. Feed rollers 40 extend through slots in rear paper chute 24 to cooperate with paper tension roller 42 which pass through slots in front paper chute 26. See FIG. 3. Tension rollers 42 are mounted on leaf springs 44 connected to shaft 46 which can be rotated by means of lever 48 to provide a gap between rollers 40 and 42 when paper is initially loaded through the chutes.

Moving horizontally opposite plate 28 is a thermal printing head 50 mounted on carriage bearing block 52 which is spindled on carriage shaft 54 of square cross-section. Connected to bearing block 52 is a cable 55 which is guided by idlers 56 to drive pulley 58 on a shaft of pulley drive stepping motor 60. The rotation of motor 60 causes the horizontal movement of head 50. Extending from carriage bearing block 52 is an interrupter tab 51 for interrupting light beams in sensors 64a to 64d horizontally positioned along housing 62.

A typical sensor 64d is shown in FIG. 3 comprising a light emitting diode 80 focused on a photodiode 82. Photodiode 82 receives the light from diode 80 unless interrupter tab 51 is in the path.

Figure 3A:
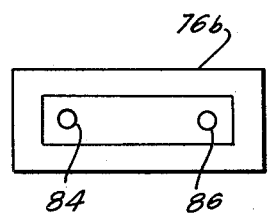
FIG. 3(a) is a front plan view of a sensor.

Mounted on platen 28 via brackets are the identical sensors 76a and 76b. Sensor 76b seen in FIG. 3 extends from bracket 29 and faces toward the path of the paper between the dancer roller 23 and the paper chute 24–26. The sensor 76b as shown in FIG. 3(a) has a light emitting diode 84 aimed at particular point in the path of the paper and a photodiode 86 also aimed at that point. Thus, when the paper is present, light from the diode 84 is reflected to the photodiode 86. When the paper is absent the photodiode 86 does not receive any reflected light.

The head 50 is of the thermal type which is energized by signals fed to it via flat cable 66 connected to terminal block 68. In order to print a character, selective portions of the head are energized (heated) by signals in the leads of cable 66, then the head 50 is pressed against the paper 22. The pressing is accomplished by rotating carriage shaft 54 which is connected via lever 70 to solenoid 72. The travel of the lever is controlled by stops 74. Stops 74 are eccentrically mounted on end plate 12 by means of screws 75 so that rotation of the stops changes the permissible travel of lever 70.

In FIG. 4 there is shown the non-mechanical portion of the printer. The apparatus includes a character source CS which can be controlled from a keyboard, external device or modem. Character source CS transmits characters represented by seven bit coded combinations in parallel onto the seven lines of cable C1–C7 along with a load pulse on line CK for each character. As the print unit PU receives each seven bit coded combination it is decoded into a coded combination of signals which are fed to the print head 50 for printing while the CK signal initiates the operation of the solenoid 72 to causing the character to be printed.

The remaining portion of the apparatus is concerned with horizontally moving the print head 50 by controllably energizing stepping motor 66 in accordance with the invention. The apparatus comprises: left margin sensor 64a which emits a pulse whenever the print head is at the left extremity of travel; a slow down sensor 64b which emits a pulse whenever the print head is at a given distance from the left margin; a short right margin sensor 64c which emits a pulse whenever the print head is at a point, say, 80 character positions to the right of the left margin; a long right margin sensor 64d which emits a pulse whenever the print head is, say 132 character positions to the right of the left margin; a paper in sensor 76a which emits a signal whenever there is no paper in the printer; and a wide paper sensor 76b which emits a signal whenever the paper in the printer is wide enough to permit printing of 130 characters per line. These sensors all transmit their signals via appropriate lines to the control unit CU which also receives signals from the decoders DK via lines TCR, BS and CKD. The decoders DK receive the signals representing the characters on lines C1 to C7 and the load pulses on line CK. The decoders DK look for two specific motion control characters, i.e., head carrier return and a back space, and, in response thereto, feed signals onto lines TCR and BS respectively. In addition, the signal of line CK is also transmitted on line CKD.

Control unit CU hereinafter more fully described processes the signals from the sensors 64 and 76 and the decoders DK and emits signals on line CCW to indicate that the print head is to move from right to left, signals on line SC to indicate how many characters positions the print head is to move, signals on line LMC to indicate when the print head is at the left margin, signals on line CKC to indicate that the head is to move one character position and signals on line CR to indicate that the print head is to move at high speed to the left margin. The phase selector PC receives the signals on lines CCW, SC and LMC and in response thereto emits signals via line Q1, Q1', Q2 and Q2' to switching network SN to indicate which of the phase windings of stepping motor 66 are to receive electric current at each instant of time. The phase selector has four different states each associated with one of four possible positions of the stepping motor. Variable duty cycle signal generator PG receives the signals on lines CKC and CR and transmits signals on line SP to switching network SN. the signals on line SP will be low duty cycle pulses in the absence of signals on lines CKC and CR, high duty cycle pulses when a signal is on line CKC and not on line CR and a constant amplitude signal when a signal in on line CR. Switching network SN includes four switches which are opened and closed in pairs and in synchronism with the signals on line SP the pairs being chosen in accordance with the signals on line Q1 to Q2'. Each switch has one terminal grounded and another terminal connected via the lines F1, F2, F3 and F4 respectively to one end of the windings W1, W2, W3 and W4 respectively of stepping motor 66. The other ends of the windings of the stepping motor are connected via a common terminal to the output terminal of current source IS whose return terminal is grounded.

The operation of the apparatus will now be described. Assume that the print head is at the left margin in response to a carrier return character emitted by character source CS.

At this time left margin sensor 64a emits a signal on line LM to control unit CU which in turn transmits a signal on line LMC to phase selector PC to make sure it is is in its initial position, i.e., in phase with the left margin. In other words, the phase selector PC should be in phase state 1 emitting signals on lines Q1 and Q2' associated with position P1 indicated by the reference vector P1 of the stepping motor 66. At the same time, due to the absence of signals on lines CKC and CR, signals generator PG is transferred a train of low duty cycle pulses to switching network SN causing the holding of the stepping motor in position P1.

Now assume source CS emits an alphabetic character to be printed. The signals representing the characters are fed to the print unit PU. At the same time the signal on line CK is fed via decoders DK and line CKD to control unit CU. Control unit CU in response thereto emits a single pulse on SC causing phase selector PC to assume state two emitting signals on lines Q1' and Q2 which alerts the switches in switching network SN connected to lines F2 and F3. At the same time control unit CU emits a pulse on line CKC of sufficient duration to insure that the stepping motor can move one step. Variable duty cycle signal generator PG emits a train of high duty cycle pulses onto line SP. The period of the pulses in the train in chosen so that a number of these pulses occur for one pulse on line CKC. The switches connected to lines F2 and F3 open and close in synchronism with the pulse train and the higher current now flowing through windings W2 and W3 cause stepping motor 66 to move to position two. At the end of the pulse train, i.e., at the end of the pulse on line CKC, the signals on line SP revert to low duty cycle pulses for holding the motor in position P2. The same cycle is repeated for every alphnumeric character or symbol to be printed as well as for SPACE characters. For a BACKSPACE character everything is the same except that decoders DK senses the character and transfers a signal of line BS to control unit CU. Control unit CU emits a signal on line CCW in parallel with the single pulse on line SC. Thus phase selector PC instead of stepping ahead to the next state steps back to the previous state. Hence, the stepping motor will rotate one step counter-clockwise.

Note as the print head moves from left to right it encounters slow-down sensor 64b. At that time the sensor 64b emits a signal on line SD and this fact is stored in control unit CU. If, thereafter, by virtue of back spacing the print head again encounters sensor 64b the stored fact is cancelled. The reason for this action is concerned with speed control during carrier return which will hereinafter be described.

A carrier return can happen under two circumstances, i.e, the character source CS can call for a carrier return which is indicated by decoders DK emitting a signal onto line TCR, or by the print head encountering one of the right margin sensors 64c or 64d. In either case control unit CU emits a signal on line CCW, a pulse train on line SC and a signal on line CR. In response to the signal on line CR the signal generator PG emits a constant voltage on line SP while phase selector PC keeps stepping back. In this way, full duty cycle current pulses as passed through the windings of the stepping motor in a sequentially, say, counter-clockwise direction driving the printing head back toward the left hand margin. As the printing head encounters slow down sensor 64b it transmits a pulse via line SD to control unit CU. Control unit CU in response thereto slows down the rate at which pulses occur on line SC and thus slowing down the rotational speed of the stepping motor so that the print head decelerates while approaching the left margin. Note that if the carrier return was called for before the print head had reached the slow down sensor 64b while printing characters, control unit CU would have emitted the pulses on line SC at this slower rate.

Figure 5:
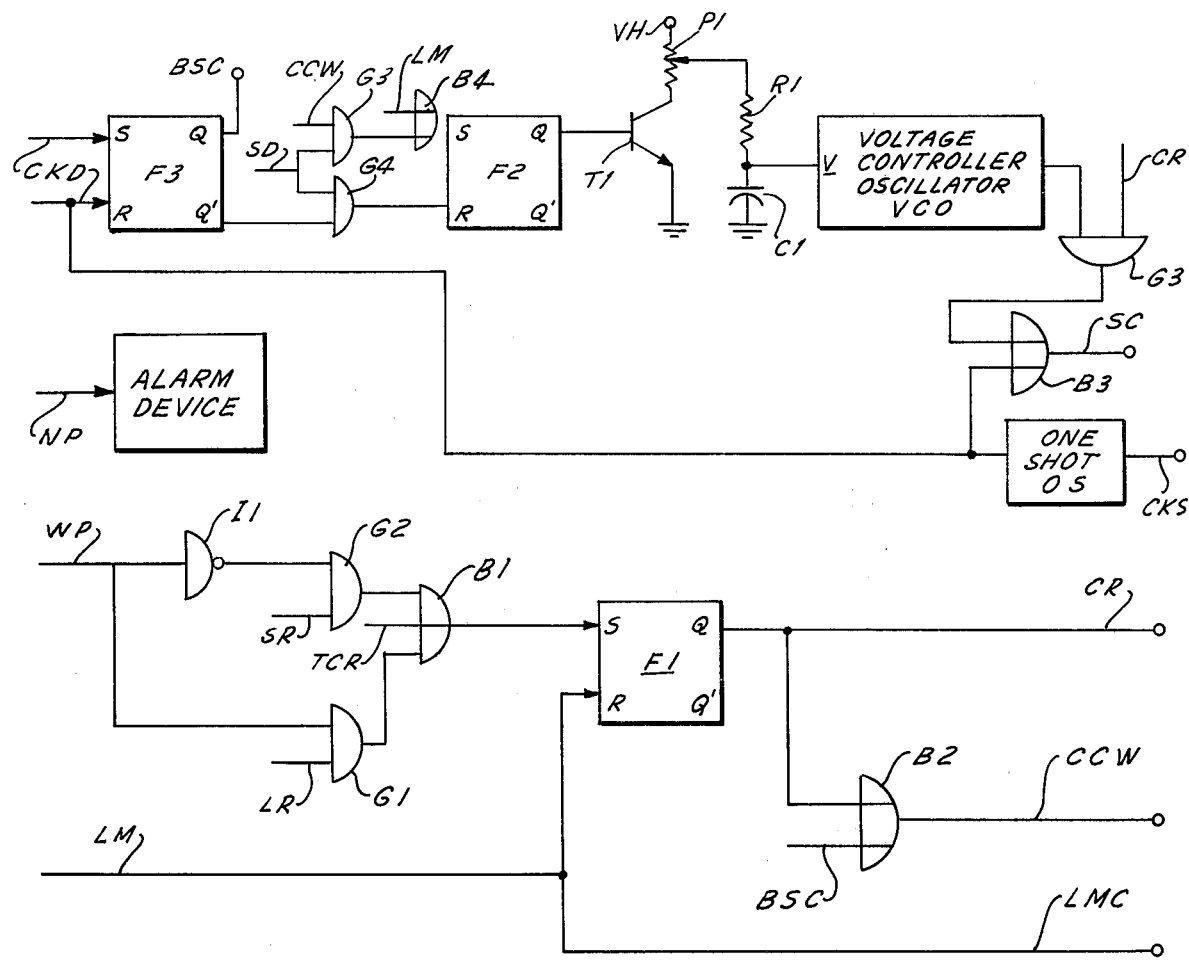
FIG. 5 is a schematic diagram of the control unit.

The details of the various units of FIG. 4 will now be described in detail. Although the decoders DK can take many forms such as read only memories a simple embodiment is a logical network, that can solve the following Boolean equations assuming an ASCII code TCR = C1'. C2'. C3'. C4.C5.C6'. C7. CK
BS = C1'. C2'. C3'. C4. C5'. C6'. C7'. CK
CKD = CK The control unit CU shown in FIG. 5 centers around a circuit for generating the stepping pulses transmitted onto line SC, and around a circuit for indicating when a carrier return is to be performed. More specifically, whenever the flipflop FF1 is set its Q output will emit a signal onto line CR indicating a carrier return is in progress. Flipflop FF1 is set by signals received from OR-circuit B1 having three inputs. One input is connected to line TCR from decoders DK to initiate a carrier return whenever the character source CS calls for it. The second input is connected to two-input AND-circuit G1 having inputs connected to lines WP and SR so that whenever there is wide paper in the printer allowing for 132 character lines indicated by a signal on line WP from wide paper sensor 76b and the interrupter 51 (FIG. 3) activates long right margin sensor 64d as indicated by a signal on line LR, an automatic carrier return is initiated. The third input of OR-circuit B1 is connected to the output of two input AND-circuit G2 whose inputs are connected to line SR and via signal inverter I1 to line WP so that whenever there is narrow paper in the printer allowing for 80 character lines indicated by the absence of a signal on line WP and the interrupter 51 activates short right margin sensor 64c as indicated by a signal on line SR an automatic carrier return is initated. When the print head reaches the left margin as indicated by a signal on line LM from left margin sensor 64a flipflop FF1 is reset. The signal on line CCW indicating movement of the print head from right to left is generated by OR-circuit B2 having inputs connected to the Q output of flipflop FF1 and the line BSC indicative of a back space. The stepping pulses fed to line SC are from the output of OR-circuit B3 having two inputs. The first input is connected to line CKD from the decoders DK so that for each character step a single pulse is obtained. The second input of the OR-circuit is connected to the output of two-input AND-circuit G3 which is active during carrier returns as controlled by the signal on line CR connected to one input thereof. The second input is connected to a voltage controlled oscillator VCO which is a free-running pulse generator that emits pulses having a repetition rate directly related to the amplitude of the voltage at its input V. Input V is connected to the junction of resistor R1 and capacitor C1 acting as an integrator. The other end of resistor R1 is connected to a tapped collector load resistor of grounded-emitter transistor T1 acting as an on/off switch whose base is connected to the Q output of a flipflop FF2. Thus, if the flipflop has been set for a while transistor T1 is on and the voltage at input V is somewhere between a voltage VH and ground potential. Thus oscillator VCO will oscillate at a first rate. Then when flipflop FF2 is restored transistor T1 will cut off immediately raising the voltage at the upper end of resistor R1 toward VH. However, because of the integrating action, the voltage at input V gradually rises toward voltage VH and the repetition rate of the pulses from oscillator VCO also gradually increases. Similarly, when transistor T1 is again turned on, the voltage at input V gradually drops because of the integrator action.

Flipflop FF2 has its set input connected to the output of OR-circuit B4 having one input connected to line LM and another input connected to the output of AND-circuit G3 whose inputs are connected to line SD and line CCW, and has its restore input connected to the output of AND-circuit G4 whose inputs are connected to line SD and the Q' output of flipflop FF3. Flipflop FF3 has its set input connected to line BS and its restore input to line CKD. Note flipflop FF3 should be biased so that if signals are simultaneously present on lines BS and CKD the flipflop will set.

Thus, when the head is at the left margin, flipflop 2 is set. It will remain set until the head moves in the left to right direction past the sensor 64b. It will then remain restored until it again moves past the sensor in the right to left direction.

Note the line CKD is fed to the input of one shot multivibrator OS which when triggered will emit a pulse on line CKC having a duration long enough for the motor to be stepped one position. Finally the control unit CU also includes an alarm device which is energized whenever a signal is not present on line NP from sensor 76a indicating the printer has no more paper.

Figure 6:
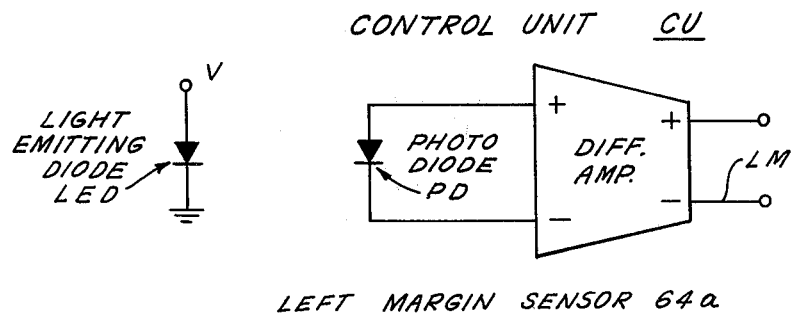
FIG. 6 is a logic diagram of a typical sensor.

In FIG. 6 the left margin sensor 64a is shown comprising a light emitting diode LED and a photo-diode PD connected to the inputs of a difference amplifier whose negative output is connected to line LM. Thus, when the diode PD does not receive light from diode LED a signal is present on liNE LM. Sensors 64b, 64c, 64d and 76a can have the same configuration whereas line WP of the sensor 76b would be connected to the positive output of the difference amplifier.

Figure 7:
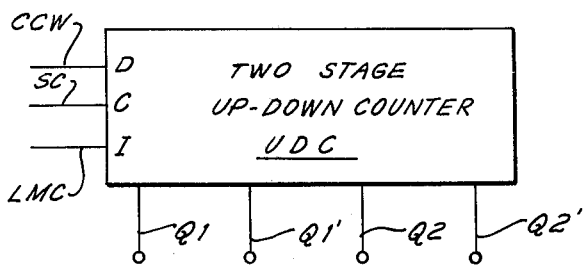
FIG. 7 is a logic diagram of a phase selector.
Figure 8:
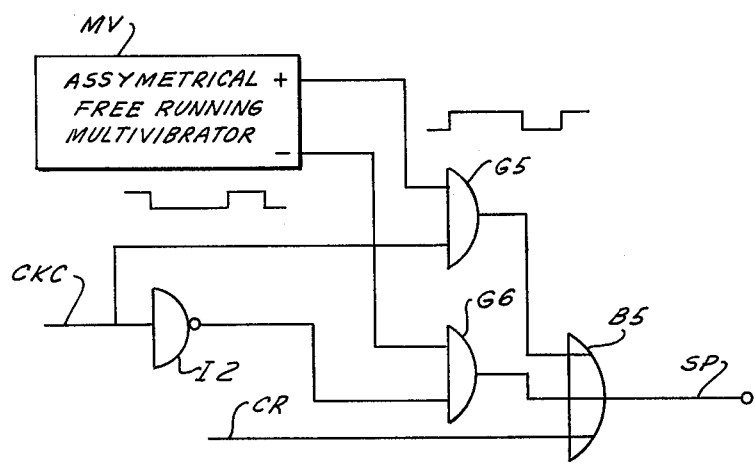
FIG. 8 is a logic diagram of a variable duty cycle pulse generator.

Phase selector PC of FIG. 7 is basically a modulo-4 up down counter UDC which is stepped by pulses received at input C and initialized by signals received at input I. The counter will count up unless it receives a signal at input D connected to line CCW.

The variable duty cycle signal generator PG feeds signals to line SP connected to the output of thos input Or-circuit B5. The first input is connected to line CR for delivering a constant amplitude signal on line SP during carrier returns. The second input is connected to the output of AND-circuit G5 whose inputs are connected to the positive output of assymetrical free-running multivibrator MV and line CKC. The third input of OR-circuit B5 is connected to the negative output of multivibrator MV and via inverter I2 to line CKC. Thus, when a signal is present on line CKC when the motor is to be stepped one position the longer duty cycle positive pulses from the positive output of the multivibrator MV are fed to line SP. In the absence of a signal on line CKC, AND-circuit G6 is open and the shorter duty cycle positive pulses from the negative output of the multivibrator MV are fed to line SP for holding the stepping motor in a fixed position.

Figure 9:
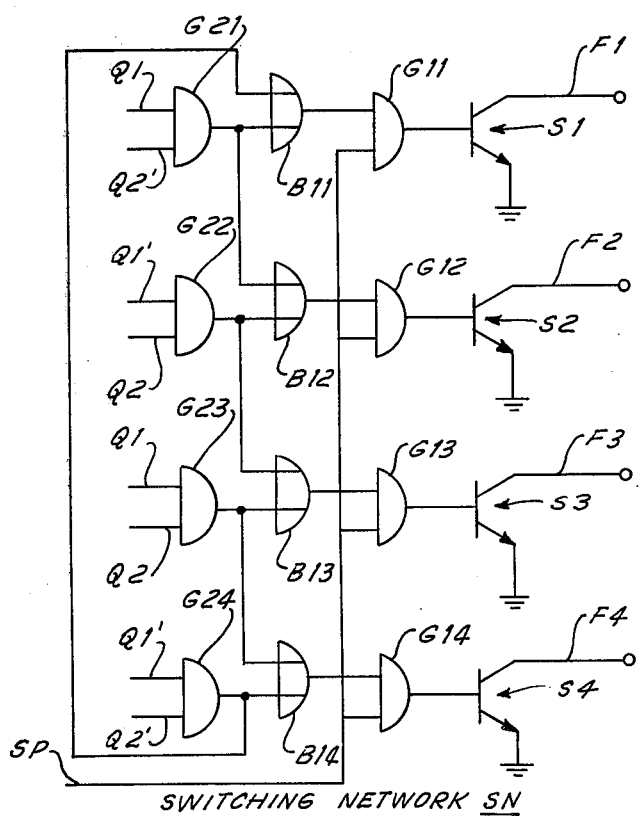
FIG. 9 is a logic diagram of a switching network.

The switching network SN of FIG. 9 shows four switches S1 and S4 in the form of power transistors. A typical switch S1 has its collector connected to line F1 and its emitter grounded. The base of the transistor is connected to the output of AND-circuit G11 so that in the absence of a signal at the output thereof the transistor is cut off. AND-circuit G11 has a first input connected to line SP and a second input connected to the output of two-input OR-circuit B11. The first input of OR-circuit B11 is connected to the output of AND-circuit G21, having inputs are connected to lines Q1 and Q2'; and the second input is connected to the output of AND-circuit G24 having inputs connected to lines Q1' and Q2'.

The remaining switches S2 to S4 are similarly controlled as is apparent from the drawing and will not be discussed any further except to say that pairs of cyclically adjacent switches are controllably energized at any one time.

There has thus been shown improved stepping motor control means which saves power by using controllably variable signals.

While only one embodiment of the invention has been shown and described in detail there will now be obvious to those skilled in the art many modifications and variations satisfying many or all of the objects of the invention without departing from the spirit thereof as defined by the appended claims.

What is claimed is:

1. Apparatus for energizing a stepping motor having a plurality of phase windings wherein one end of each winging is connected to a common terminal and the other end of each winding is connected to a different distinct terminal, said apparatus comprising: a source of electric current having a first terminal connected to said common terminal and having a second terminal; a plurality of controllably operable current switching means, each of said current switching means being connected between a different one of said distinct terminals and the second terminal of said source of electric current; a switching network having a plurality of inputs and outputs, each of said outputs being connected to the control input of a different one of said controllably operable switching means; phase selector means having a plurality of outputs connected to different inputs of said switching network for selecting which of said controllably operable switching means are to be energized at any given time; and a selectively variable duty cycle signal generator having an output connected to an input of said switching network for controlling the duty cycle of the energization of the controllably operable switching means to be energized at a first duty cycle when the stepping motor is to be at rest and at a greater duty cycle when the stepping motor is to be stepped.

2. The apparatus of claim 1 wherein said phase selector means comprises a pulse generator means, and sequential selecting means responsive to the reception of each pulse from said pulse generator means for selecting another switching means to be operable.

3. The apparatus of claim 2 wherein said sequential selecting means comprises a pulse counter means.

4. The apparatus of claim 3 wherein said pulse generator means is controllably variable to generator pulses at different repetition rates.

5. The apparatus of claim 4 wherein said pulse generator means comprises a free running pulse generator for generating trains of pulses, one step means for generating single pulses on command and means for selecting the trains of pulses or the single pulses for transfer to said pulse counter means.

6. The apparatus of claim 4 wherein said pulse generator means comprises means for generating a control signal which is controllably switchable between two amplitudes and a free running pulse generator for generating a train of pulses having a repetition rate which is a function of the amplitude of a control signal.

7. The apparatus of claim 6 further comprising means for gradually changing the amplitude of the control signal during the switching between the two amplitudes.

8. The apparatus of claim 3 wherein said pulse counter means is an up-down pulse counter and further comprising means for controlling the counting directing of said up-down pulse counter.

9. The apparatus of claim 1 wherein said selectively variable duty cycle signal generator comprises a pulse generator means for generating pulses.

10. The apparatus of claim 9 wherein said selectively variable duty cycle signal generator further comprises means for generating a signal having a constant amplitude and means for selecting the transfer of the pulses or the constant amplitude signals to the output of said controllably variable duty cycle signal generator.

11. The apparatus of claim 9 wherein said pulse generator means comprises a free-running assymetrical pulse generator having first and second outputs for generating two trains of pulses which are oppositely phased.

12. Apparatus for energizing a stepping motor having a plurality of phase windings wherein one end of each winding is connected to a common terminal and the other end of each winding is connected to a different distinct terminal, said apparatus comprising a source of electric current having a first terminal connected to said common terminal and having a second terminal, a plurality of controllably operable current switching means each having a control input, each of said current switching means being connected between a different one of said distinct terminals and the second terminal of said source of electric current, means for periodically energizing a selected group of said switching means with first pulses having a first duty cycle when the stepping motor is to be held at a given position, means for periodically energizing a different selected group of said switching means with second pulses having a second duty cycle when the stepping motor is to be rotated from said given position to an adjacent position, sequencing control means or sequencially selecting a different group of said switching means for energization by said second pulses and stepping speed control means for controlling said sequencing control means to sequentially select said groups of switching means at different rates.

13. The apparatus of claim 12 wherein the stepping speed control means controls the sequential energization to occur at selected first or second rates.

14. The apparatus of claim 4 wherein said stepping speed control means further comprises means for causing a gradual change in the rate during the switching between the selected first and second rates.

* * * * *